(12) United States Patent
Alwan et al.

(10) Patent No.: US 10,913,499 B2
(45) Date of Patent: Feb. 9, 2021

(54) VEHICLE HINGE PILLAR ASSEMBLY

(71) Applicant: Ford Global Technologies, LLC, Dearborn, MI (US)

(72) Inventors: Jamil M. Alwan, Ann Arbor, MI (US); Djamal Eddine Midoun, Ann Arbor, MI (US); Thiag Subbian, Farmington Hills, MI (US); Jayanth Kumar Basavalingiah, West Bloomfield, MI (US); Vladimir Vladimirovich Bogachuk, West Bloomfield, MI (US); Satish Ganti, Canton, MI (US); Pavan Nagaraj, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 16/406,270

(22) Filed: May 8, 2019

(65) Prior Publication Data

US 2020/0353995 A1 Nov. 12, 2020

(51) Int. Cl.
*B62D 25/04* (2006.01)
*B62D 25/20* (2006.01)

(52) U.S. Cl.
CPC ......... *B62D 25/04* (2013.01); *B62D 25/2036* (2013.01)

(58) Field of Classification Search
CPC ............................ B62D 25/04; B62D 25/2036
USPC ............ 296/193.06, 203.01–203.03, 187.09, 296/187.1, 187.12
See application file for complete search history.

(56) References Cited

U.S. PATENT DOCUMENTS

| | | | | |
|---|---|---|---|---|
| 3,724,153 A | * | 4/1973 | Wessells, III | B62D 21/09 296/203.03 |
| 9,487,236 B2 | * | 11/2016 | Ozawa | B62D 25/082 |
| 9,688,311 B2 | | 6/2017 | Yamamoto et al. | |
| 9,821,853 B2 | | 11/2017 | Torikawa et al. | |
| 9,849,918 B2 | | 12/2017 | Hartmann et al. | |
| 2016/0083015 A1 | * | 3/2016 | Kiyoshita | B62D 25/04 296/187.09 |
| 2017/0203793 A1 | | 7/2017 | Nakamura et al. | |

FOREIGN PATENT DOCUMENTS

| | | |
|---|---|---|
| JP | 2015096350 A | 5/2015 |
| JP | 2016155434 A | 9/2015 |

* cited by examiner

*Primary Examiner* — Dennis H Pedder
(74) *Attorney, Agent, or Firm* — Frank A. MacKenzie; Bejin Bieneman

(57) ABSTRACT

An assembly includes a hinge pillar having an inner member and an outer member. The assembly includes a brace between the inner member and the outer member, the brace having a side portion fixed to the outer member and a front portion fixed to the inner member.

19 Claims, 5 Drawing Sheets

VEHICLE HINGE PILLAR ASSEMBLY

BACKGROUND

Vehicles include hinge pillars that support doors of the vehicle. The hinge pillar may include inner and outer members. In the event of an impact to the vehicle, the hinge pillar may deform. Such deformation may include separation of the members from each other, e.g., a phenomenon referred to as oil canning.

DETAILED DESCRIPTION

Figure 1:
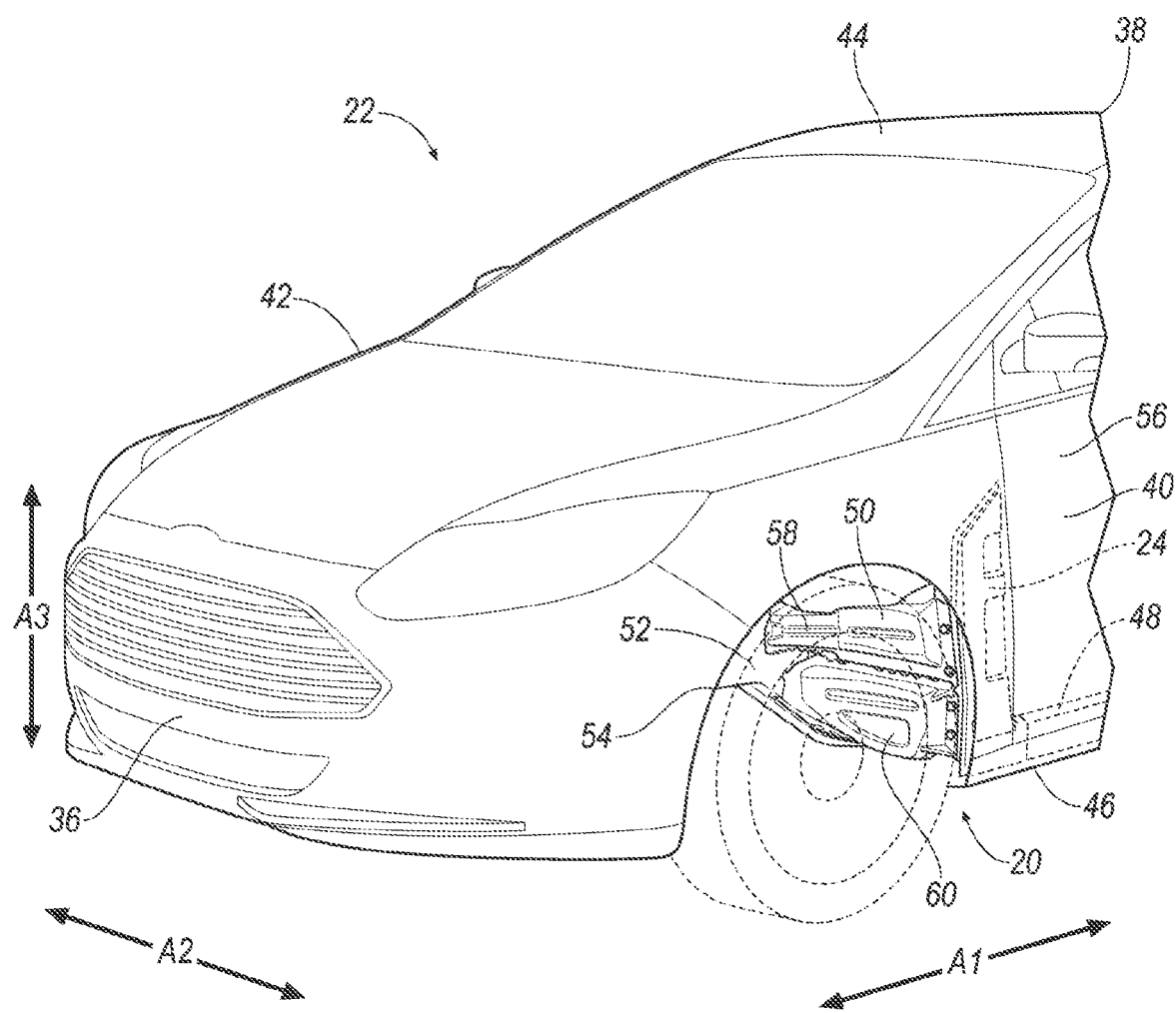
FIG. 1 is a perspective view of a vehicle having a hinge pillar assembly.
Figure 2:
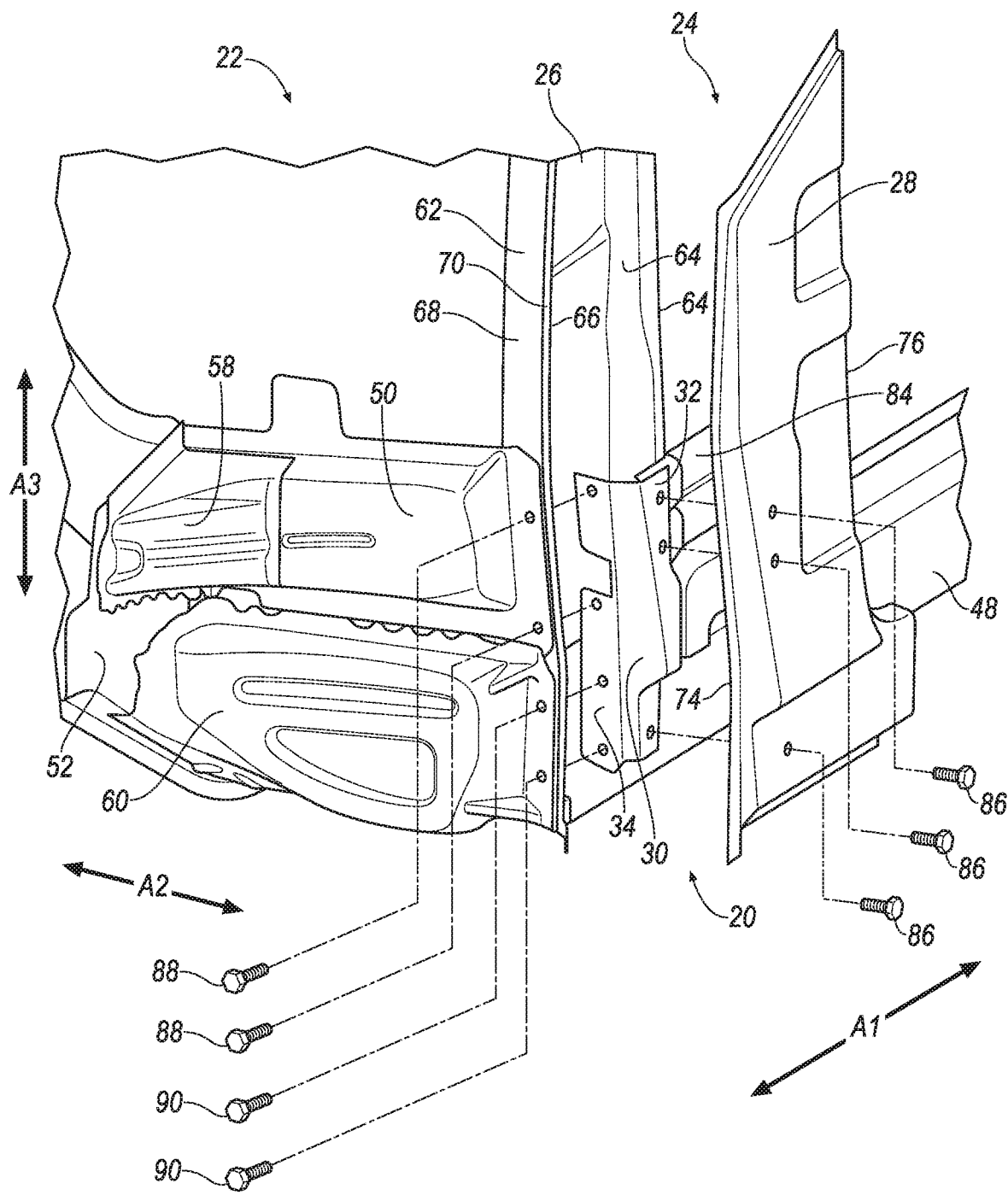
FIG. 2 is a perspective exploded view of the hinge pillar assembly of FIG. 1.

An assembly includes a hinge pillar having an inner member and an outer member. The assembly includes a brace between the inner member and the outer member, the brace having a side portion fixed to the outer member and a front portion fixed to the inner member.

The assembly may include a plurality of fasteners fixing the side portion to the outer member and the front portion to the inner member.

The inner member and the outer member may each include a front edge, and further comprising a weld fixing the front edge of the inner member to the front edge of the outer member.

The assembly may include a dash cross member fixed to the front portion of the brace.

The inner member of the hinge pillar may be between the front portion of the brace and the dash cross member.

The assembly may include a fastener fixing the brace, the inner member of the hinge pillar, and the dash cross member to each other.

The assembly may include a torque box fixed to the front portion of the brace.

The inner member of the hinge pillar may be between the front portion of the brace and the torque box.

The assembly may include a fastener fixing the brace, the inner member of the hinge pillar, and the torque box to each other.

The assembly may include a reinforcement member fixed to the side portion of the brace and between the inner member and the outer member of the hinge pillar.

The outer member of the hinge pillar may include an inner face, the reinforcement member fixed to the inner face of the outer member.

The side portion may extend transversely from the front portion.

The assembly may include a wheel well and a door, the hinge pillar and the brace between the wheel well and the door.

The brace may be elongated along a vehicle-vertical axis.

The side portion may extend rearward from the front portion.

The front portion may extend along a cross-vehicle axis and a vehicle-vertical axis, and the side portion may extend along a vehicle-longitudinal axis and the cross-vehicle axis.

The assembly may include a dash cross member fixed to the front portion of the brace and a torque box fixed to the front portion of the brace.

The assembly may include a first fastener fixing the dash cross member, the inner member of the hinge pillar, and the brace to each other, and a second fastener fixing the torque box, the inner member of the hinge pillar, and the brace to each other.

The inner member and the outer member may each include a front edge, and the assembly may include a weld fixing the front edge of the inner member to the front edge of the outer member at the dash cross member and the torque box.

The brace may be monolithic.

With reference to the Figures, wherein like numerals indicate like parts throughout the several views, an assembly 20 for a vehicle 22 includes a hinge pillar 24 having an inner member 26 and an outer member 28. The assembly 20 includes a brace 30 between the inner member 26 and the outer member 28, the brace 30 having a side portion 32 fixed to the outer member 28 and a front portion 34 fixed to the inner member 26. The brace 30 increases a strength of the hinge pillar 24, e.g., reducing a likelihood of the inner member 26 separating from the outer member 28 during a frontal impact to the vehicle 22.

In the following description, relative orientations and directions (by way of example, top, bottom, front, rear, forward, rearward, upward, downward, outboard, inboard, inward, outward, lateral, left, right, etc.) are from the perspective of an occupant seated in a seat, facing a dashboard of the vehicle 22. Orientations and directions relative to the assembly 20 are given relative to when the assembly 20 is supported by the vehicle 22 as described below and shown in the Figures.

The vehicle 22 may be any type of passenger or commercial automobile such as a car, a truck, a sport utility vehicle, a crossover vehicle, a van, a minivan, a taxi, a bus, etc.

The vehicle 22 may define a vehicle-longitudinal axis A1, e.g., extending between a front 36 and a rear 38 of the vehicle 22. The vehicle 22 may define a cross-vehicle axis A2, e.g., extending between a left side 40 and a right side 42 of the vehicle 22. The vehicle 22 may define a vehicle-vertical axis A3, e.g., extending between a top 44 and a bottom 46 of the vehicle 22. The vehicle-longitudinal axis A1, the cross-vehicle axis A2, and the vehicle-vertical axis A3 are perpendicular to each other.

The vehicle 22 may be of a unibody construction, i.e. a unitary-body construction. In the unibody construction, components of the frame and the body of the vehicle 22, e.g., rocker rails 48, a dash cross member 50, the hinge pillar 24, inner rails 52, etc., are unitary, i.e., a continuous one-piece unit. As another example, the frame may have a body-on-frame construction (also referred to as a cab-on-frame construction). In other words, the body and frame are separate components, i.e., are modular, and the body is supported on and affixed to the frame. Alternatively, the frame may have any suitable construction. The frame may be formed of any suitable material, for example, steel, aluminum, etc.

The vehicle 22 includes a passenger cabin to house occupants, if any, of the vehicle 22. The passenger cabin includes one or more seats. The seats may be bucket seats or other types. The position and orientation of the seats and components thereof may be adjustable by an occupant.

Wheel wells 54 may house the wheels. The wheel wells 54 may have an arch shape that is open on an outboard side and enclosed on an inboard side. Two wheel wells 54 may be on each of the right side 42 and the left side 40 of the vehicle 22, e.g., with one at the front 36 and one at the rear 38 of each side 40, 42.

A door 56 may selectively provide entry and egress to and from the vehicle 22. The door 56 is above the rocker rail 48. The door 56 may be pivotally supported by the hinge pillar 24.

The inner rails 52 provide rigidity to the vehicle 22 and support other vehicle components. The inner rails 52 are elongated along the vehicle-longitudinal axis A1. The inner rails 52 may extend from the front 36 of the vehicle 22 to the rear 38 of the vehicle 22. In other words, the inner rails 52 may extend from in front of the wheel wells 54 at the front 36 of the vehicle 22 to behind the wheel wells 54 at the rear 38 of the vehicle 22. The inner rails 52 may be tubular, e.g., being rectangular in cross-section, or any suitable shape. The inner rails 52 may be steel, aluminum, or any suitable material. The inner rails 52 may be referred to as frame rails or sled runner rails.

The rocker rails 48 provide rigidity at the right side 42 and the left side 40 of the vehicle 22 and support other vehicle components, such as the doors 56. The rocker rails 48 are outboard of the inner rails 52. In other words, the inner rails 52 are between the rocker rails 48 relative to the cross-vehicle axis A2. The rocker rails 48 are elongated along the vehicle-longitudinal axis A1.

The dash cross member 50 provide rigidity to the vehicle 22 along the cross-vehicle axis A2 and supports other vehicle components, such as an instrument panel. The dash cross member 50 is in front of the passenger cabin. The dash cross member 50 may be elongated along the cross-vehicle axis A2. The dash cross member 50 may extend from the right side 42 of the vehicle 22 to the left side 40 of the vehicle 22. The dash cross member 50 may be steel, aluminum or any suitable material. A gusset 58 may connect the dash cross member 50 to the inner rail 52.

A torque box 60 may be included in the assembly 20 to provide increased strength to the vehicle 22 rearward of the wheel well 54 at the front of the vehicle 22 by connecting the inner rail 52 to the rocker rail 48. The torque box 60 may be between the wheel well 54 and the door 56 relative to the vehicle-longitudinal axis A1. The torque box 60 may be steel, aluminum, or any suitable material.

The hinge pillar 24 is elongated along the vehicle-vertical axis A3. For example, the hinge pillar 24 may extend from a floor of the vehicle 22 toward a roof the vehicle 22. The hinge pillar 24 is forward of the door 56 along the vehicle-longitudinal axis A1. The hinge pillar 24 is between the door 56 and the wheel well 54 at the front of the vehicle 22. The hinge pillar 24 may be at a forward end of the rocker rail 48.

The inner member 26 of the hinge pillar 24 is inboard of the outer member 28 of the hinge pillar 24. In other words, the inner member 26 of the hinge pillar 24 is closer to a center of the vehicle 22 than the outer member 28 along the cross-vehicle axis A2. The inner member 26 may include a front portion 62 and a rear portion 64 spaced from the front portion 62, e.g., along the vehicle-longitudinal axis A1. The front portion 62 may include a rear face 66 that faces the rear 38 of the vehicle 22. The front portion 62 may include a front face 68 that faces the front of the vehicle 22. The front face 68 may be opposite the rear face 66. The front face 68 may abut the dash cross member 50 and/or the torque box 60. The inner member 26 may include a front edge 70 and a rear edge 72. The front edge 70 is forward of the rear edge 72 along the vehicle-longitudinal axis A1. The front edge 70 may be on the front portion 62. The front edge 70 and the rear edge 72 may be elongated along the vehicle-vertical axis A3. The inner member 26 may be stamped steel, or any suitable material. The inner member 26 may be monolithic, i.e., a one-piece unit without any fasteners, joints, welding, adhesives, etc., fixing the inner member 26 together.

The outer member 28 of the hinge pillar 24 is outboard of the inner member 26. In other words, the outer member 28 is farther from the center of the vehicle 22 than the inner member 26 along the cross-vehicle axis A2. The outer member 28 may include a front edge 74 and a rear edge 76. The front edge 74 is forward of the rear edge 76 along the vehicle-longitudinal axis A1. The front edge 74 and the rear edge 76 may be elongated along the vehicle-vertical axis A3. The outer member 28 of the hinge pillar 24 includes an inner face 78. The inner face 78 faces inboard, i.e., toward the inner member 26. The outer member 28 may be stamped steel, or any suitable material. The outer member 28 may be monolithic.

The outer member 28 is fixed to the inner member 26. The inner member 26 and the outer member 28 may define a cavity 80 therebetween. For example, a weld 82 may fix the front edge 70 of the inner member 26 to the front edge 74 of the outer member 28. The weld 82 may fix the front edge 70 of the inner member 26 to the front edge 74 of the outer member 28 at the dash cross member 50 and/or the torque box 60. In other words, the weld 82 and the dash cross member 50 and/or torque box 60 may be at a common position relative to the vehicle-vertical axis A3. As another example, a weld may fix the rear edge 72 of the inner member 26 to the rear edge 76 of the outer member 28. As yet another example, the brace 30 fixes the inner member 26 to the outer member 28. The weld 82 fixes the inner member 26 to the outer member 28 by heating the surfaces to the point of melting with the inner member 26 fused the outer member 28 upon cooling, or by adding molten material to the inner member 26 and the outer member 82 where such members 26, 28 abut.

The inner member 26 may be fixed to the outer member 28 with both the weld 82 and the brace 30. Fixing the inner member 26 to the outer member 28 with the weld 82 and the brace 30 increases strength of the hinge pillar 24. For example, the brace 30 may increase an amount of tension stress required to separate the inner member 26 from the outer member 28, and the weld 82 may increase an amount of sheer stress required to separate the inner member 26 from the outer member 28.

Figure 3:
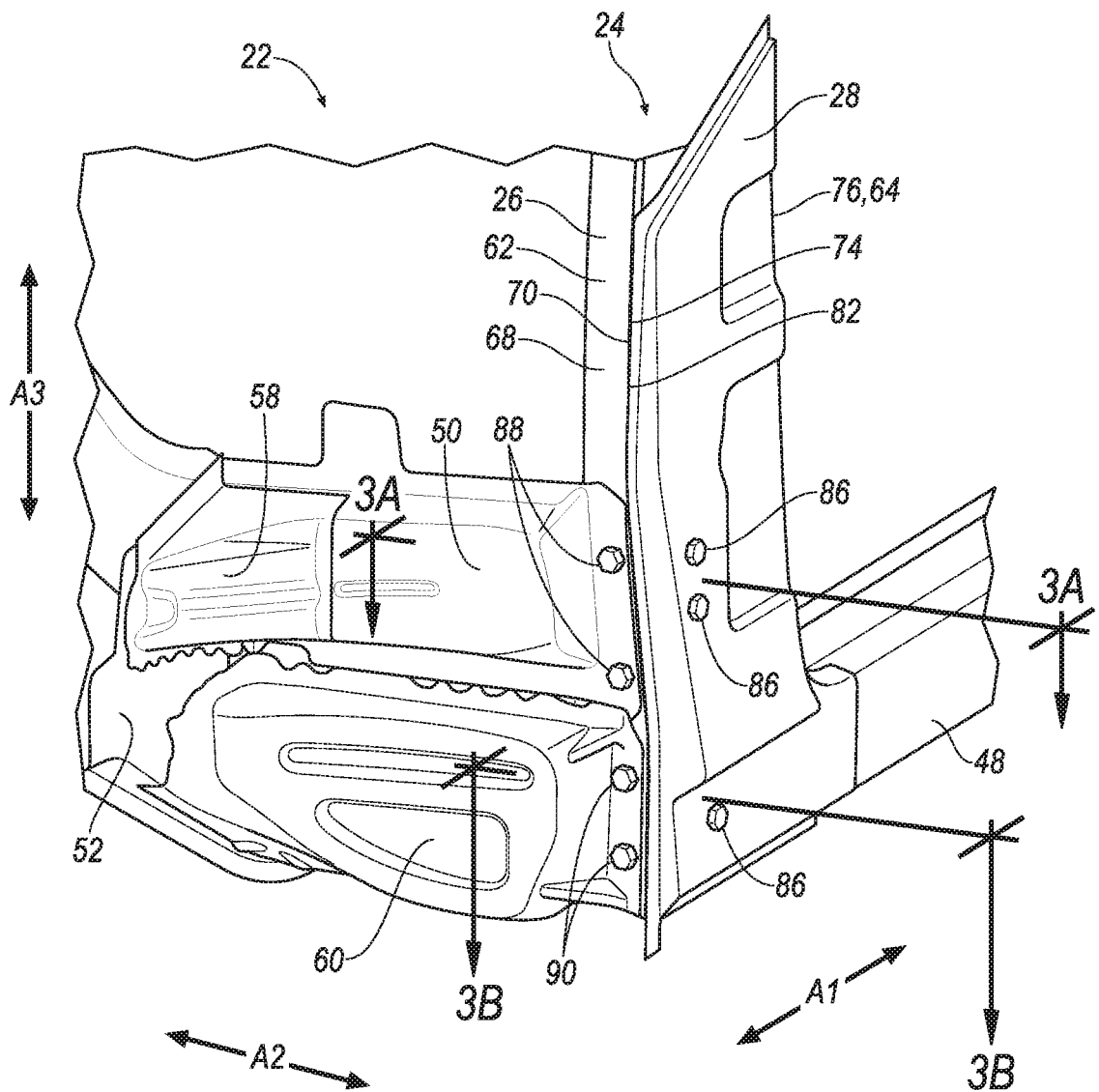
FIG. 3 is a perspective view of the hinge pillar assembly.
Figure 3A:
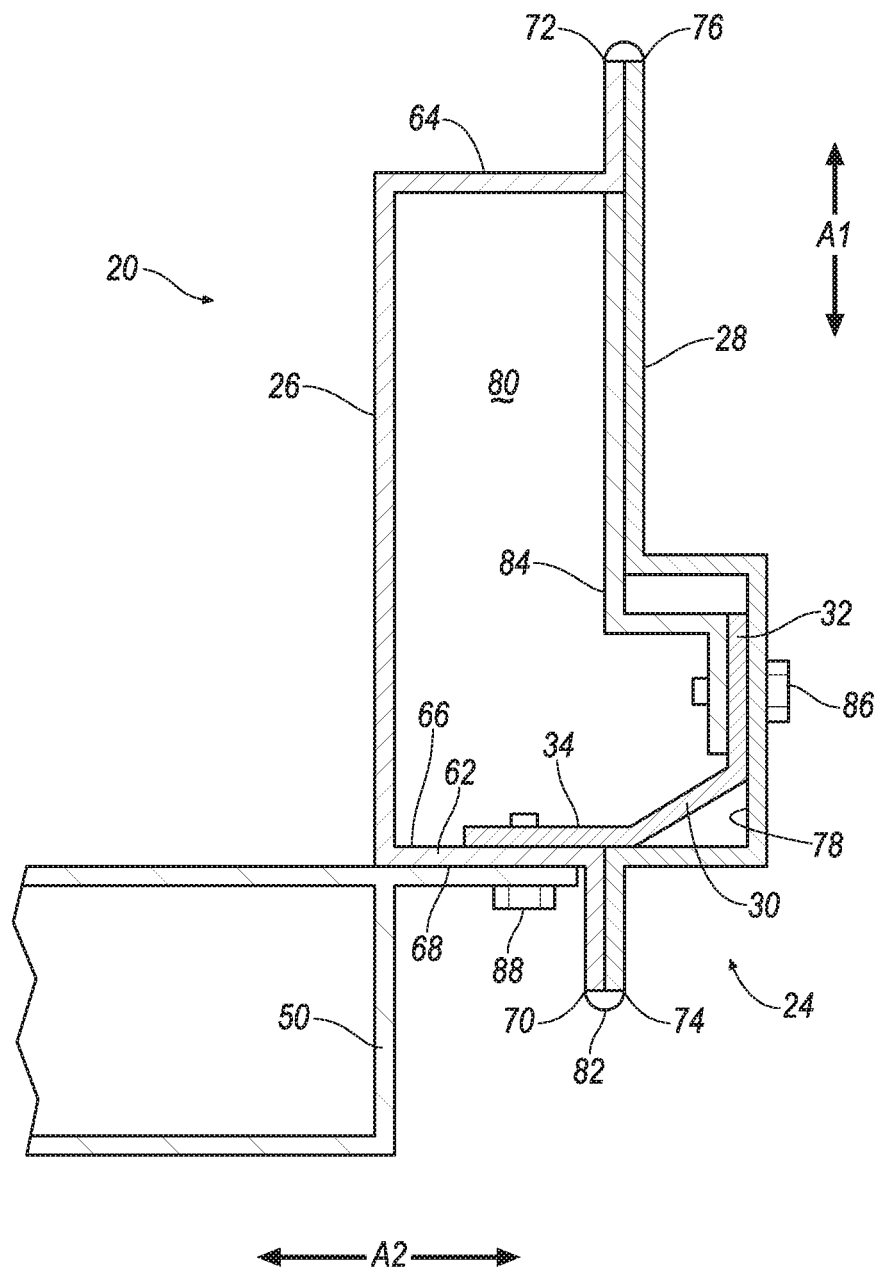
FIG. 3A is a cross section of the hinge pillar assembly taken along line 3A in FIG. 3.
Figure 3B:
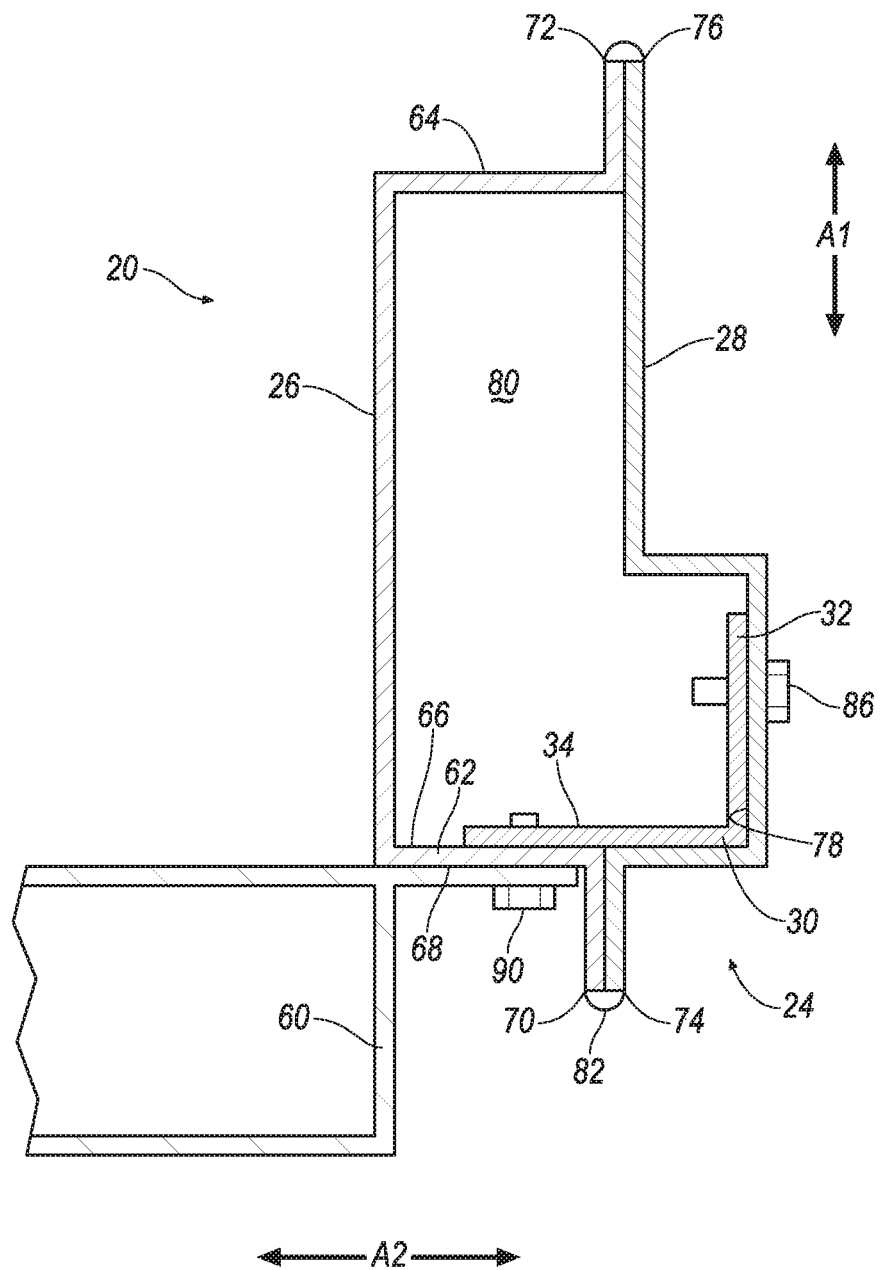
FIG. 3B is a cross section of the hinge pillar assembly taken along line 3B in FIG. 3.

With reference to FIGS. 1, 3A, and 3B, the assembly 20 may include a reinforcement member 84. The reinforcement member 84 may be between the inner member 26 and the outer member 28 of the hinge pillar 24, e.g., along the cross-vehicle axis A2. The reinforcement member 84 may be in the cavity 80. The reinforcement member 84 may be fixed to the outer member 28, e.g., to the inner face 78 of the outer member 28. The reinforcement member 84 may be fixed to the outer member 28 via weld, fasteners, etc. The reinforcement member 84 may be elongated along the vehicle-longitudinal axis A1. The reinforcement member 84 may be steel, or any suitable material.

The brace 30 increases strength of the hinge pillar 24, i.e., by fixing the inner member 26 to the outer member 28. The brace 30 is elongated along the vehicle-vertical axis A3. The brace 30 is between the inner member 26 and the outer member 28 along the cross-vehicle axis A2. The brace 30 is between the wheel well 54 and the door 56 along the vehicle-longitudinal axis A1. The brace 30 may be in the cavity 80.

The brace 30 includes the front portion 34. The front portion 34 may extend along the cross-vehicle axis A2 and the vehicle-vertical axis A3. The brace 30 includes the side portion 32. The side portion 32 may extend transversely from the front portion 34. For example, the side portion 32 may extend rearward from the front portion 34, i.e., from the front portion 34 toward the rear 38 of the vehicle 22. The side portion 32 may extend along the vehicle-longitudinal axis A1 and the cross-vehicle axis A2. The brace 30 may be monolithic, i.e., a one-piece unit without any fasteners, joints, welding, adhesives, etc., fixing the front portion 34 and the side portion 32 together.

The front portion 34 of the brace 30 may abut the rear face 66 of the front portion 62 of the inner member 26 of the hinge pillar 24. The front portion 62 of the inner member 26 of the hinge pillar 24 may be between the front portion 34 of the brace 30 and the dash cross member 50 along the vehicle-longitudinal axis A1. The front portion 62 of the inner member 26 of the hinge pillar 24 may be between the front portion 34 of the brace 30 and the torque box 60 along the vehicle-longitudinal axis A1.

The side portion 32 of the brace 30 may abut the inner face 78 of the outer member 28 of the hinge pillar 24. The side portion 32 of the brace 30 may be between the outer member 28 and the reinforcement member 84 along the cross-vehicle axis A2.

A plurality of fasteners 86, 88, 90 may secure the brace 30 to the outer member 28 and the inner member 26. Fasteners 86, 88, 90 are separate component that engages the brace 30 and the outer member 28 or the inner member 26 to join the brace 30 to the outer member 28 and the inner member 26. The fasteners 86, 88, 90 may be rivets, bolts and nuts, threaded fasteners, etc. The bolts may be welded to the brace 30.

The side portion 32 of the brace 30 may be fixed to the outer member 28 and the reinforcement member 84. For example, one or more fasteners 86 may fix the side portion 32 of the brace 30 to the outer member 28 and the reinforcement member 84. The fasteners 86 may extend through openings in the outer member 28, the reinforcement member 84, and the side portion 32 of the brace 30.

The front portion 34 of the brace 30 may be fixed to the inner member 26, the dash cross member 50, and the torque box 60. For example, one or more fasteners 88 may fix the front portion 34 of the brace 30, the front portion 62 of the inner member 26 of the hinge pillar 24, and the dash cross member 50 to each other. The fasteners 88 may extend through openings in the front portion 62 of the inner member 26, the dash cross member 50, and the front portion 34 of the brace 30. As another example, one or more fasteners 90 may fix the front portion 34 of the brace 30, the front portion 62 of the inner member 26 of the hinge pillar 24, and the torque box 60 to each other. The fasteners 90 may extend through openings in the front portion 34 of the inner member 26, the torque box 60, and the front portion 34 of the brace 30.

During a front impact to the vehicle 22 a wheel in one of the wheel wells 54 may be urged toward the rear 38 of the vehicle 22. The wheel may impact the dash cross member 50 and/or the torque box 60. Force from the impact may be transmitted to the hinge pillar 24. The force may deform the hinge pillar 24 and urge the inner member 26 and the outer member 28 away from each other (a phenomenon known as "oil canning") and may generate tension stress in the weld 82. The brace 30 reduces separation of the inner member 26 from the outer member 28 by fixing the inner member 26 to the outer member 28, and to the dash cross member 50 and the torque box 60.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a hinge pillar having an inner member and an outer member, the inner member and the outer member each including a front edge;
   a weld fixing the front edge of the inner member to the front edge of the outer member; and
   a brace between the inner member and the outer member, the brace being monolithic and extending from the inner member across the weld to the outer member along a cross-vehicle axis, the brace having a side portion fixed to the outer member on one side of the weld and a front portion fixed to the inner member at an opposite side of the weld.

2. The assembly of claim 1, further comprising a plurality of fasteners fixing the side portion to the outer member and the front portion to the inner member.

3. The assembly of claim 1, further comprising a dash cross member fixed to the front portion of the brace.

4. The assembly of claim 3, wherein the inner member of the hinge pillar is between the front portion of the brace and the dash cross member.

5. The assembly of claim 3, further comprising a fastener fixing the brace, the inner member of the hinge pillar, and the dash cross member to each other.

6. The assembly of claim 1, further comprising a reinforcement member fixed to the side portion of the brace and between the inner member and the outer member of the hinge pillar.

7. The assembly of claim 6, wherein the outer member of the hinge pillar includes an inner face, the reinforcement member fixed to the inner face of the outer member.

8. The assembly of claim 1, wherein the side portion extends transversely from the front portion.

9. The assembly of claim 1, further comprising a wheel well and a door, the hinge pillar and the brace between the wheel well and the door.

10. The assembly of claim 1, wherein the brace is elongated along a vehicle-vertical axis.

11. The assembly of claim 1, wherein the side portion extends rearward from the front portion.

12. The assembly of claim 1, wherein the front portion extends along a cross-vehicle axis and a vehicle-vertical axis, and the side portion extends along a vehicle-longitudinal axis and the cross-vehicle axis.

13. An assembly, comprising:
    a hinge pillar having an inner member and an outer member;
    a brace between the inner member and the outer member, the brace having a side portion fixed to the outer member and a front portion fixed to the inner member; and
    a torque box fixed to the front portion of the brace.

14. The assembly of claim 13, wherein the inner member of the hinge pillar is between the front portion of the brace and the torque box.

15. The assembly of claim 13, further comprising a fastener fixing the brace, the inner member of the hinge pillar, and the torque box to each other.

16. The assembly of claim 13, further comprising a dash cross member fixed to the front portion of the brace.

17. The assembly of claim 16, further comprising a first fastener fixing the dash cross member, the inner member of the hinge pillar, and the brace to each other, and a second fastener fixing the torque box, the inner member of the hinge pillar, and the brace to each other.

18. The assembly of claim 1, further comprising a first fastener fixing the brace to the inner member at the front portion of the brace and a second fastener fixing the brace to the outer member at the side portion of the brace.

19. The assembly of claim 18, wherein the weld is between the first fastener and the second fastener along the cross-vehicle axis.

* * * * *